United States Patent
Miyazaki

(10) Patent No.: US 9,056,527 B2
(45) Date of Patent: Jun. 16, 2015

(54) RUBBER COMPOSITION FOR TIRE AND PNEUMATIC TIRE

(75) Inventor: Tatsuya Miyazaki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 517 days.

(21) Appl. No.: 13/472,962

(22) Filed: May 16, 2012

(65) Prior Publication Data

US 2012/0296027 A1  Nov. 22, 2012

(30) Foreign Application Priority Data

May 17, 2011 (JP) ................. 2011-110558

(51) Int. Cl.
| | |
|---|---|
| C08L 61/10 | (2006.01) |
| C08K 3/04 | (2006.01) |
| B60C 1/00 | (2006.01) |
| C08L 7/00 | (2006.01) |
| C08L 21/00 | (2006.01) |
| C08L 61/06 | (2006.01) |

(52) U.S. Cl.
CPC ............. *B60C 1/0016* (2013.04); *B60C 1/0025* (2013.04); *B60C 1/00* (2013.01); *C08L 7/00* (2013.01); *C08L 21/00* (2013.01); *C08L 61/06* (2013.01); *Y02T 10/862* (2013.01)

(58) Field of Classification Search
USPC ........................................................ 524/496
See application file for complete search history.

(56) References Cited

U.S. PATENT DOCUMENTS 5,679,728 A * 10/1997 Kawazura et al. ............ 523/215

FOREIGN PATENT DOCUMENTS

| JP | 2694566 | B2 | | 12/1997 | | |
|---|---|---|---|---|---|---|
| JP | 3146319 | B2 | | 3/2001 | | |
| JP | 3894626 | B2 | | 3/2007 | | |
| JP | 2008-031427 | A | | 2/2008 | | |
| JP | 2009-127041 | A | | 6/2009 | | |
| JP | 2010-052724 | A | | 3/2010 | | |
| JP | 2010-053161 | | * | 3/2010 | ............... | C08G 8/12 |
| JP | 2010-053161 | A | | 3/2010 | | |
| JP | 4553919 | B2 | | 9/2010 | | |

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

Provided are a rubber composition for a tire which can achieve good handling stability, good fuel economy, good elongation at break, and good steering response in a balanced manner while maintaining good extrusion processability; and a pneumatic tire produced using the rubber composition. The rubber composition includes: 100 parts by mass of a rubber component; 0.5 to 20 parts by mass of an alkylphenol resin; and 0.04 to 10 parts by mass of a methylene donor, wherein the alkylphenol resin is produced from formaldehyde and at least two compounds selected from the group consisting of a 2-alkylphenol, a 3-alkylphenol, and a 4-alkylphenol, and a total amount of the free 2-alkylphenol, 3-alkylphenol, and 4-alkylphenol in the alkylphenol resin is not more than 3% by mass.

18 Claims, No Drawings

RUBBER COMPOSITION FOR TIRE AND PNEUMATIC TIRE

TECHNICAL FIELD

The present invention relates to a rubber composition for a tire, and a pneumatic tire using the same.

BACKGROUND ART

Rubber compositions for a tire are required to have properties such as high hardness (E*), low tan δ at 30° C. to 70° C., and excellent elongation at break.

Methods for achieving high hardness include adding a compound such as sulfur, a vulcanization accelerator, a resorcinol resin, or a polyethylene resin, and increasing the amount of filler such as carbon black or silica. However, achieving both high hardness (E*) and good elongation at break (EB) is difficult with these methods.

Generally, a rubber composition having an elongation at break of less than 100%, even if having high hardness, cannot be used as a rubber composition for a tire which is required to have durability. For example, the elongation at break measured at room temperature (25° C.) is required to be at least 100% in the case of a rubber composition for a bead apex, at least 200% in the case of a rubber composition for a breaker (a rubber composition for a breaker topping), and at least 350% in the case of a rubber composition for a tread (cap tread or base tread) or a sidewall.

Both high hardness (E*) and not less than 100% of elongation at break (EB) can be achieved by addition of a phenol resin. This addition, however, is disadvantageously accompanied by an increase of tan δ, and thus it has been difficult to achieve high hardness (E*), low tan δ (good fuel economy), and good elongation at break in a balanced manner. For this reason, rubber compositions containing a phenol resin are seldom used for tire components other than bead apexes and breakers in the current state of the art.

Patent Documents 1 and 2 each involve a rubber composition containing a cresol resin as an alkylphenol resin. However, the cresol resins used in Patent Documents 1 and 2 are obtained by using only m-cresol, which is a 3-alkylphenol, as the alkylphenol component (monomer component); here, use of resins obtainable using monomer components other than 3-alkylphenols (e.g. 2-alkylphenols, 4-alkylphenols) and the amount of free monomer components contained (remaining) in alkylphenol resins have not been studied in detail. Therefore, these rubber compositions still leave something to be desired in terms of achieving high hardness (good handling stability), low tan δ (good fuel economy), good elongation at break, and good steering response in a balanced manner while maintaining good extrusion processability.

Patent Document 1: JP 2008-31427 A
Patent Document 2: JP 2010-52724 A

SUMMARY OF THE INVENTION

The present invention aims to provide a rubber composition for a tire which can solve the above problems and achieve good handling stability, good fuel economy, good elongation at break, and good steering response in a balanced manner while maintaining good extrusion processability; and a pneumatic tire produced using the rubber composition.

The present inventor has made various studies and has arrived at the following hypothesis.

That is, an alkylphenol resin, during kneading of the rubber composition, forms composite spheres with carbon black and even with a softener if the latter is used. The distribution of these composite spheres is uneven, which results in a large energy loss generated between rubber and filler when the rubber composition is deformed, whereby the fuel economy is deteriorated.

A desirable measure to take to solve the above problem is considered to be allowing the composite spheres to have high hardness after vulcanization and a uniform size, and to be highly dispersed in the rubber composition.

The impurities contained (remaining) in the alkylphenol resin, particularly unreacted (free) alkylphenol components (monomer components), have low molecular weights, and therefore may practically function as a plasticizer. Therefore, reducing the amount of the unreacted monomer components remaining in the resin probably leads to a more increase in the hardness of the composite spheres.

The present inventor has further found that addition of an alkylphenol resin derived from a combination of alkylphenols having different positional relationships between the hydroxy group and the alkyl group (e.g. a 2-alkylphenol and a 3-alkylphenol) as the monomer components to a rubber composition enables the composite spheres to have a more uniform size and to be highly dispersed in the resulting rubber composition. Thereby, the present invention has been completed.

Specifically, the present invention relates to a rubber composition for a tire, including: 100 parts by mass of a rubber component; 0.5 to 20 parts by mass of an alkylphenol resin; and 0.04 to 10 parts by mass of a methylene donor, wherein the alkylphenol resin is produced from formaldehyde and at least two compounds selected from the group consisting of a 2-alkylphenol, a 3-alkylphenol, and a 4-alkylphenol, and a total amount of the free 2-alkylphenol, 3-alkylphenol, and 4-alkylphenol in the alkylphenol resin is not more than 3% by mass.

The 2-alkylphenol, the 3-alkylphenol, and the 4-alkylphenol are preferably o-cresol, m-cresol, and p-cresol, respectively.

The alkylphenol resin is preferably produced from a 2-alkylphenol, a 3-alkylphenol, a 4-alkylphenol, and formaldehyde.

The total amount of the free 2-alkylphenol, 3-alkylphenol, and 4-alkylphenol in the alkylphenol resin is preferably not more than 1% by mass.

The alkylphenol resin preferably has a softening point of 115° C. to 140° C.

The alkylphenol resin preferably includes 96 to 100% by mass of a novolac phenol resin.

The methylene donor is preferably at least one compound selected from the group consisting of hexamethylenetetramine, hexamethoxymethylol melamine, and hexamethylol melamine pentamethyl ether.

Preferably, the rubber composition for a tire is for use as a rubber composition for a breaker topping and/or a rubber composition for a sheet located on the top or bottom of a breaker edge/a sheet of a breaker topping, and the rubber composition includes 1 to 5 parts by mass of the alkylphenol resin and 1 to 7 parts by mass of hexamethoxymethylol melamine and/or hexamethylol melamine pentamethyl ether as the methylene donor, for each 100 parts by mass of the rubber component.

Preferably, the rubber composition for a tire is for use as a rubber composition for a sidewall, a rubber composition for a base tread, a rubber composition for a tie gum, a rubber composition for a clinch apex, and/or a rubber composition for a soft bead apex, and the rubber composition includes 0.5 to 5 parts by mass of the alkylphenol resin and 0.04 to 5 parts by mass of hexamethylenetetramine as the methylene donor, for each 100 parts by mass of the rubber component.

Preferably, the rubber composition for a tire is for use as a rubber composition for a bead apex, a rubber composition for a strip apex, and/or a rubber composition for a bead wire topping, and the rubber composition includes 5 to 20 parts by mass of the alkylphenol resin and 0.4 to 5 parts by mass of hexamethylenetetramine as the methylene donor, for each 100 parts by mass of the rubber component.

Preferably, the rubber composition for a tire is for use as a rubber composition for a bead apex, a rubber composition for a strip apex, and/or a rubber composition for a bead wire topping, and the rubber composition further includes 40 to 80 parts by mass of carbon black having a nitrogen adsorption specific surface area of 25 to 50 $m^2/g$ for each 100 parts by mass of the rubber component.

The present invention also relates to a pneumatic tire including a tire component produced using the above rubber composition.

The tire component is preferably at least one selected from the group consisting of a bead apex, a cap tread, a base tread, a sidewall, a tie gum, a breaker, a strip apex, a bead wire topping, a clinch apex, a soft bead apex, and a sheet located on the top or bottom of a breaker edge/a sheet of a breaker topping.

The present invention enables to achieve good handling stability, fuel economy, elongation at break, and steering response in a balanced manner while maintaining good extrusion processability because the rubber composition for a tire according to the present invention includes specific amounts of an alkylphenol resin and a methylene donor, wherein the alkylphenol resin is produced from formaldehyde and at least two compounds selected from the group consisting of a 2-alkylphenol, a 3-alkylphenol, and a 4-alkylphenol, and the total amount of the free (unreacted and thus remaining in the resin) 2-alkylphenol, 3-alkylphenol, and 4-alkylphenol in the alkylphenol resin is not more than a specific amount.

BEST MODE FOR CARRYING OUT THE INVENTION

The rubber composition for a tire according to the present invention includes specific amounts of an alkylphenol resin and a methylene donor, wherein the alkylphenol resin is produced from formaldehyde and at least two compounds selected from the group consisting of a 2-alkylphenol, a 3-alkylphenol, and a 4-alkylphenol, and the total amount of the free 2-alkylphenol, 3-alkylphenol, and 4-alkylphenol (total amount of free alkylphenols) in the alkylphenol resin is not more than a specific amount. Such a rubber composition enables to improve the handling stability, fuel economy, and steering response while maintaining good extrusion processability, and to reduce the decrease in elongation at break as caused by addition of a resin. Thereby, a pneumatic tire can be produced with high productivity which has good handling stability, good fuel economy, good elongation at break, and good steering response in a balanced manner.

Examples of rubbers which may be contained in the rubber component in the rubber composition of the present invention include natural rubber (NR), isoprene rubber (IR), butadiene rubber (BR), styrene butadiene rubber (SBR), styrene isoprene butadiene rubber (SIBR), isoprene rubber (IR), ethylene propylene diene rubber (EPDM), chloroprene rubber (CR), and acrylonitrile butadiene rubber (NBR). Each of the rubbers for the rubber component may be used alone, or two or more of the rubbers may be used in combination. Among these, NR and IR are preferable in terms of excellent processability (extrusion processability), excellent elongation at break, and excellent fuel economy; BR is preferable in terms of excellent crack growth resistance and excellent abrasion resistance; and SBR is preferable in terms of excellent grip performance and excellent reversion resistance.

In the case that the rubber composition is used as a rubber composition for a bead apex, a rubber composition for a strip apex, or a rubber composition for a bead wire topping, BR and SBR are preferably used in combination with NR.

In the case that the rubber composition is used as a rubber composition for a sidewall, a rubber composition for a base tread, a rubber composition for a tie gum, a rubber composition for a clinch apex, or a rubber composition for a soft bead apex, NR and BR are preferably used in combination.

The NR is not particularly limited, and ones usually used in the tire industry, such as SIR20, RSS#3, and TSR20, can be used.

The BR is not particularly limited, and ones usually used in the tire industry, such as high cis-content BR (e.g. BR1220 from Zeon Corporation, BR150B from Ube Industries, Ltd.), BR containing 1,2-syndiotactic polybutadiene crystals (SPB) (SPB-containing BR) (e.g. VCR412 and VCR617 from Ube Industries, Ltd.), and butadiene rubber synthesized in the presence of a rare-earth catalyst (rare-earth BR), can be used.

In the case that the rubber composition is used as a rubber composition for a bead apex, a rubber composition for a strip apex, a rubber composition for a clinch apex, a rubber composition for a sidewall, or a rubber composition for a tie gum, the BR is preferably SPB-containing BR in terms of improving the hardness (E*) and abrasion resistance.

In the case that the rubber composition is used as a rubber composition for a sidewall, a rubber composition for a base tread, a rubber composition for a tie gum, a rubber composition for a clinch apex, or a rubber composition for a soft bead apex, the BR is preferably rare-earth BR in terms of improving the elongation at break, abrasion resistance, and fuel economy.

The SPB-containing BR is preferably one having 1,2-syndiotactic polybutadiene crystals (SPB) chemically bonded with BR and dispersed without any orientations, not merely one having SPB crystals dispersed therein. If the SPB crystals are chemically bonded with the rubber component and dispersed therein, crack initiation and propagation tend to be suppressed.

The SPB preferably has a melting point of not lower than 180° C., and more preferably not lower than 190° C. If the melting point of SPB is lower than 180° C., the crystals tend to melt during press-vulcanization of the tire, thereby leading to a decrease in the hardness (handling stability). Also, the SPB preferably has a melting point of not higher than 220° C., and more preferably not higher than 210° C. If the melting point of SPB is higher than 220° C., the molecular weight of the SPB-containing BR increases and the SPB-containing BR tends to be less dispersible in the rubber composition, resulting in a decrease in the extrusion processability.

The amount of a boiling n-hexane insoluble matter in the SPB-containing BR is preferably not less than 2.5% by mass, and more preferably not less than 8% by mass. If the amount of a boiling n-hexane insoluble matter is less than 2.5% by mass, the rubber composition tends not to have sufficient hardness (handling stability). The amount of a boiling n-hexane insoluble matter is preferably not more than 22% by mass, more preferably not more than 20% by mass, and still more preferably not more than 18% by mass. If the amount of a boiling n-hexane insoluble matter is more than 22% by mass, the SPB-containing BR itself tends to have high viscosity, which results in a decrease in the dispersibility of the SPB-containing BR and the filler in the rubber composition, thereby decreasing the extrusion processability. Here, the boiling n-hexane insoluble matter refers to SPB in the SPB-containing BR.

The rare-earth catalyst may be a known one such as a catalyst containing a lanthanide rare-earth compound, an organic aluminum compound, an aluminoxane, or a halogen-containing compound, optionally with a Lewis base. Particularly, an Nd catalyst is preferable which contains a neodymium (Nd)-containing compound as the lanthanide rare-earth compound.

Examples of the lanthanide rare-earth compound include halides, carboxylates, alcoholates, thioalcoholates, and amides of rare-earth metals with an atomic number of 57 to 71. Among these, Nd catalysts are preferable as described above in terms of obtaining BR having a high cis-content and a low vinyl content.

The organic aluminum compound may be one represented by $AlR^a R^b R^c$ (wherein $R^a$, $R^b$, and $R^c$ are the same as or different from each other, each representing hydrogen or a C1 to C8 hydrocarbon group). Examples of the aluminoxane include acyclic aluminoxanes and cyclic aluminoxanes. Examples of the halogen-containing compound include aluminum halides represented by $AlX_k R^d_{3-k}$ (wherein X represents a halogen, $R^d$ represents a C1 to C20 alkyl group, aryl group, or aralkyl group, and k represents 1, 1.5, 2, or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base is used for complexing the lanthanide rare-earth compound, and may suitably be a compound such as acetylacetone, a ketone, and an alcohol.

The rare-earth catalyst may be used dissolved in an organic solvent (e.g. n-hexane, cyclohexane, n-heptane, toluene, xylene, benzene) or supported on an appropriate carrier (e.g. silica, magnesia, magnesium chloride) at the time of the polymerization of butadiene. With regard to the polymerization conditions, the polymerization may be either solution polymerization or bulk polymerization, the preferable polymerization temperature is −30° C. to 150° C., and the polymerization pressure may be of any pressure depending on the other conditions.

The rare-earth BR preferably has a Mooney viscosity $ML_{1+4}$ (100° C.) of not smaller than 35, and more preferably not smaller than 40. If the Mooney viscosity is smaller than 35, the viscosity of the unvulcanized rubber composition may be low, leading to a decrease in the extrusion processability. The rare-earth BR preferably has a Mooney viscosity of not greater than 55, and more preferably not greater than 50. If the Mooney viscosity is greater than 55, the unvulcanized rubber composition may be very hard and may be less likely to be able to have smooth edges after extrusion (the extrusion processability may decrease).

The Mooney viscosity is measured in accordance with ISO 289 or JIS K6300.

The rare-earth BR preferably has a ratio (Mw/Mn) of the weight average molecular weight (Mw) to the number average molecular weight (Mn) of not less than 1.2, and more preferably not less than 1.5. If the ratio is less than 1.2, the decrease in the extrusion processability tends to be significant. The rare-earth BR preferably has an Mw/Mn of not more than 5, and more preferably not more than 4. If the ratio is more than 5, the effect of improving the abrasion resistance tends to be small.

The rare-earth BR preferably has an Mw of not less than 300,000 and more preferably not less than 400,000, but preferably not more than 1,500,000 and more preferably not more than 1,200,000. Also, the rare-earth BR preferably has an Mn of not less than 100,000 and more preferably not less than 150,000, but preferably not more than 1,000,000 and more preferably not more than 800,000. If the Mw and Mn are less than the respective lower limits, the abrasion resistance tends to decrease and the fuel economy tends to decrease. If the Mw and Mn are more than the respective upper limits, the extrusion processability may decrease.

The Mw and Mn herein are values determined by gel permeation chromatography (GPC) and calibrated relative to polystyrene standards.

The rare-earth BR preferably has a cis content of not less than 90% by mass, more preferably not less than 93% by mass, and still more preferably not less than 95% by mass. If the rare-earth BR has a cis content of less than 90% by mass, the abrasion resistance may decrease, and therefore good abrasion resistance and good fuel economy may not be achieved at the same time.

The rare-earth BR preferably has a vinyl content of not more than 1.8% by mass, more preferably not more than 1.0% by mass, still more preferably not more than 0.5% by mass, and particularly preferably not more than 0.3% by mass. If the vinyl content is more than 1.8% by mass, the abrasion resistance may decrease, and therefore good abrasion resistance and good fuel economy may not be achieved at the same time.

The vinyl content (1,2-butadiene unit content) and cis content (cis-1,4-butadiene unit content) of rare-earth BR herein can be measured by infrared absorption spectrometry.

The SBR is not particularly limited, and examples thereof include emulsion-polymerized styrene butadiene rubber (E-SBR) and solution-polymerized styrene butadiene rubber (S-SBR). Particularly, E-SBR is preferable in terms of achieving good processability (extrusion processability) and high hardness (E*), and of its inexpensiveness.

In the case that the rubber composition is used as a rubber composition for a breaker (rubber composition for a breaker topping) or a rubber composition for a sheet located on the top or bottom of a breaker edge/a sheet of a breaker topping, the amount of NR in 100% by mass of the rubber component is preferably not less than 60% by mass, and more preferably not less than 80% by mass, or may be 100% by mass. If the amount is less than 60% by mass, good elongation at break may not be achieved.

In the case that the rubber composition is used as a rubber composition for a bead apex, a rubber composition for a strip apex, or a rubber composition for a bead wire topping, the amount of NR in 100% by mass of the rubber component is preferably not less than 30% by mass, and more preferably not less than 40% by mass. If the amount is less than 30% by mass, good extrusion processability (e.g. adhesion, apex uprightness, and edge smoothness) and good elongation at break may not be achieved. The amount of NR is preferably not more than 90% by mass, more preferably not more than 80% by mass, still more preferably not more than 70% by mass, and particularly preferably not more than 60% by mass. If the amount is more than 90% by mass, reversion may occur easily and high hardness (E*) is less likely to be achieved.

In the case that the rubber composition is used as a rubber composition for a bead apex, a rubber composition for a strip apex, or a rubber composition for a bead wire topping, the amount of SBR in 100% by mass of the rubber component is preferably not less than 5% by mass, and more preferably not less than 10% by mass. If the amount is less than 5% by mass, the hardness (E*) and the reversion resistance may be deteriorated. The amount of SBR is preferably not more than 40% by mass, and more preferably not more than 30% by mass. If the amount is more than 40% by mass, good elongation at break may not be achieved.

In the case that the rubber composition is used as a rubber composition for a sidewall, a rubber composition for a base tread, a rubber composition for a tie gum, a rubber composition for a clinch apex, or a rubber composition for a soft bead apex, the amount of NR in 100% by mass of the rubber component is preferably not less than 40% by mass, and more preferably not less than 50% by mass. If the amount is less than 40% by mass, good processability (extrusion processability) and good elongation at break may not be achieved. The amount of NR is preferably not more than 80% by mass, and more preferably not more than 70% by mass. If the amount is more than 80% by mass, good crack-growth resistance and good abrasion resistance may not be achieved.

In the case that the rubber composition is used as a rubber composition for a sidewall, a rubber composition for a base tread, a rubber composition for a tie gum, a rubber composition for a clinch apex, or a rubber composition for a soft bead apex, the amount of BR in 100% by mass of the rubber component is preferably not less than 20% by mass, and more preferably not less than 30% by mass. If the amount is less than 20% by mass, good crack-growth resistance and good abrasion resistance may not be achieved. The amount of BR is preferably not more than 60% by mass, and more preferably not more than 50% by mass. If the amount is more than 60% by mass, good processability (extrusion processability) and good elongation at break may not be achieved.

The present invention employs a specific alkylphenol resin. The alkylphenol resin used in the present invention is produced from formaldehyde and at least two compounds selected from the group consisting of a 2-alkylphenol, a 3-alkylphenol, and a 4-alkylphenol, and the total amount of the free 2-alkylphenol, 3-alkylphenol, and 4-alkylphenol (total amount of free alkylphenols) in the alkylphenol resin is not more than 3% by mass.

The alkylphenol resin used in the present invention can contribute to an increase in the hardness of the composite spheres mentioned above probably because the amount of unreacted alkylphenol components (monomer components) contained in the alkylphenol resin is not more than a specific amount.

Further, the alkylphenol resin used in the present invention is produced using, as the monomer components, a combination of alkylphenols having different positional relationships between the hydroxy group and the alkyl group (e.g. a 2-alkylphenol and a 3-alkylphenol). Thus, probably because of addition of such an alkylphenol resin to a rubber composition, the composite spheres can have a more uniform size and be highly dispersed in the rubber composition. More specifically, the reason that the composite spheres can have higher hardness and a more uniform size and be highly dispersed in the rubber composition is probably because a combination of alkylphenols having different positional relationships between the hydroxy group and the alkyl group results in random orientations of the alkyl groups, leading to an easily crosslinkable structure which increases the crosslink density.

Owing to the above effects, addition of a specific alkylphenol resin to a rubber composition brings high hardness after vulcanization and a uniform size of the composite spheres and high dispersibility of the composite spheres in the rubber composition. The addition therefore improves the handling stability, fuel economy, and steering response while maintaining good extrusion processability, and also reduces the decrease in elongation at break as caused by addition of a resin. Probably for this reason, it is possible to achieve good handling stability, fuel economy, elongation at break, and steering response in a balanced manner while maintaining good extrusion processability.

The alkylphenol resin is produced from formaldehyde and at least two compounds selected from the group consisting of a 2-alkylphenol, a 3-alkylphenol, and a 4-alkylphenol. Specifically, the alkylphenol resin is a resin (novolac phenol resin) produced by reacting formaldehyde and at least two compounds selected from the group consisting of a 2-alkylphenol, a 3-alkylphenol, and a 4-alkylphenol, in the presence of an acid catalyst.

The alkylphenols used as the monomer components are at least two compounds selected from the group consisting of a 2-alkylphenol, a 3-alkylphenol, and a 4-alkylphenol. Here, use of three compounds, a 2-alkylphenol, a 3-alkylphenol, and a 4-alkylphenol, is preferable to favorably achieve the effects of the present invention.

The carbon number of the alkyl group in each alkylphenol is not particularly limited, but is preferably 1 to 10, more preferably 1 to 5, still more preferably 1 to 3, and particularly preferably 1 because the effects of the present invention can be favorably achieved. Alkylphenols having alkyl groups with different carbon numbers may be used in combination.

The most preferable case for the monomer components is that the 2-alkylphenol, the 3-alkylphenol, and the 4-alkylphenol are o-cresol, m-cresol, and p-cresol, respectively. That is, the case is preferable in which the alkylphenol resin is a cresol resin.

The acid catalyst is not particularly limited, and may be, for example, a boron trifluoride-ether complex, a boron trifluoride-phenol complex, a boron trifluoride-water complex, a boron trifluoride-alcohol complex, a boron trifluoride-amine complex, or a mixture thereof. Particularly preferable examples thereof include boron trifluoride, a boron trifluoride-phenol complex, and a boron trifluoride-ether complex.

The method of reacting formaldehyde and alkylphenols in the presence of an acid catalyst is not particularly limited, and may be a known method. For example, the method may include dissolving an acid catalyst, alkylphenols, and formaldehyde in an appropriate solvent, and reacting these compounds at 100° C. to 180° C. for 1 to 10 hours.

The method of purifying the alkylphenol resin obtained through the above reaction is not particularly limited, and may include, for example, dissolving the alkylphenol resin in a solvent, and performing purification such as recrystallization, column chromatography, and distillation until the total amount of free alkylphenols in the alkylphenol resin decreases to not more than a specific amount. Thereby, the above alkylphenol resin can be obtained. The distillation may be suitably performed by the method described in JP 2011-74205 A.

The total amount of the free 2-alkylphenol, 3-alkylphenol, and 4-alkylphenol (total amount of free alkylphenols) in the alkylphenol resin is not more than 3% by mass, preferably not more than 2% by mass, and more preferably not more than 1% by mass. If the amount is more than 3% by mass, the hardness of the composite spheres after vulcanization decreases, and the effects of the present invention cannot be achieved sufficiently.

The total amount of free alkylphenols is a value measured by gel permeation chromatography (GPC).

The alkylphenol resin preferably includes 96 to 100% by mass, more preferably 98 to 100% by mass, and still more preferably 99 to 100% by mass, of a novolac phenol resin. If the amount of the novolac phenol resin is less than 96% by mass, the hardness of the composite spheres after vulcanization may decrease, and the effects of the present invention may not be achieved sufficiently.

The amount of a novolac phenol resin is a value measured by gel permeation chromatography (GPC).

In order to make the composite spheres have a more uniform size and more highly dispersed in the rubber composition, it is preferable to have the alkylphenol resin itself dispersed sufficiently and then liquefied during the kneading of the rubber composition. If the softening point is too low, the alkylphenol resin may be liquefied before the fillers are dispersed to some extent during the kneading, and therefore good dispersion of the alkylphenol resin may not be achieved. Meanwhile, if the softening point is too high, polymers are softened as the temperature increases, and thus the resulting torque is insufficient to crush lumps of the alkylphenol resin. Accordingly, the dispersibility of the alkylphenol resin may be deteriorated and liquefaction of the resin may be insufficient, which results in insufficient formation of the composite spheres. A softening point of the alkylphenol resin in the following range contributes to a more uniform size of the composite spheres and higher dispersibility of the composite spheres in the rubber composition, thereby leading to better effects of the present invention.

The softening point of the alkylphenol resin is preferably not lower than 115° C., more preferably not lower than 120° C., and still more preferably not lower than 125° C. Also, the softening point is preferably not higher than 140° C., and more preferably not higher than 135° C.

The softening point of an alkylphenol resin, which is measured as set forth in JIS K 6220-1:2001 with a ring and ball softening point apparatus, is the temperature at which the ball drops down.

The softening point of the alkylphenol resin can be adjusted by adjusting the combination and ratio of monomer components selected from a 2-alkylphenol, a 3-alkylphenol, and a 4-alkylphenol to confer appropriate anisotropy and crystallinity. For example, since the melting points of o-cresol, m-cresol, and p-cresol are respectively 30° C., 12° C., and 35.5° C., a person skilled in the art can adjust the ratio of these cresols based on the melting point information in order to adjust the softening point of the alkylphenol resin to a desired temperature.

Further, since the total amount of free alkylphenols in the alkylphenol resin affects the softening point, adjusting the total amount also enables to adjust the softening point of the alkylphenol resin.

The weight average molecular weight (Mw) of the alkylphenol resin is preferably not less than 1000, and more preferably not less than 1500. The Mw is preferably not more than 3000, more preferably not more than 2500, and still more preferably not more than 1900. If the Mw is in the above range, the effects of the present invention can be more favorably achieved.

The weight average molecular weight (Mw) is a value determined by gel permeation chromatography (GPC) and calibrated relative to polystyrene standards.

The GPC measurement herein was performed under the following conditions (1) to (8).
(1) Device: HLC-8020 from TOSOH CORP.
(2) Separation column: GMH-XL from TOSOH CORP. (two columns in tandem)
(3) Measurement temperature: 40° C.
(4) Carrier: tetrahydrofuran
(5) Flow rate: 0.6 mL/min
(6) Injection rate: 5 μL
(7) Detector: Differential refractometer
(8) Molecular weight standards: polystyrene standards The amount of the alkylphenol resin is 0.5 to 20 parts by mass for each 100 parts by mass of the rubber component. If the amount is less than 0.5 parts by mass, sufficient handling stability, fuel economy, and steering response cannot be achieved. Meanwhile, if the amount is more than 20 parts by mass, the elongation at break and fuel economy deteriorate.

In the case that the rubber composition is used as a rubber composition for a breaker topping or a rubber composition for a sheet located on the top or bottom of a breaker edge/a sheet of a breaker topping, the amount of the alkylphenol resin is preferably 1 to 5 parts by mass, and more preferably 2 to 4 parts by mass, for each 100 parts by mass of the rubber component. The hardness (E*) required for these rubber compositions is lower than that required for a rubber composition for a bead apex, and an amount of the alkylphenol resin in the above range enables to achieve good fuel economy and good elongation at break while maintaining the hardness (E*) required for these rubber compositions, and thereby to achieve good handling stability, good fuel economy, good elongation at break, and good steering response in a balanced manner.

In the case that the rubber composition is used as a rubber composition for a sidewall, a rubber composition for a base tread, a rubber composition for a tie gum, a rubber composition for a clinch apex, or a rubber composition for a soft bead apex, the amount of the alkylphenol resin is preferably 0.5 to 5 parts by mass, and more preferably 1 to 4 parts by mass, for each 100 parts by mass of the rubber component.

The hardness (E*) required for these rubber compositions is lower than that required for a rubber composition for a bead apex, and properties such as chipping resistance (elongation at break) are important for these rubber compositions. Here, an amount of the alkylphenol resin in the above range enables to achieve good fuel economy and good elongation at break while maintaining the hardness (E*) required for these rubber compositions, and thereby to achieve good handling stability, good fuel economy, good elongation at break, and good steering response in a balanced manner.

In the case that the rubber composition is used as a rubber composition for a bead apex, a rubber composition for a strip apex, or a rubber composition for a bead wire topping, the amount of the alkylphenol resin is preferably 5 to 20 parts by mass, and more preferably 7 to 16 parts by mass, for each 100 parts by mass of the rubber component.

The hardness (E*) required for these rubber compositions is high, and thus the amount of the alkylphenol resin in such a rubber composition is large compared to the case that the rubber composition is used for other tire components.

A methylene donor is used in the present invention. Use of a methylene donor with the alkylphenol resin enables to achieve good handling stability, good fuel economy, good elongation at break, and good steering response in a balanced manner while maintaining good extrusion processability.

Examples of the methylene donor include hexamethylenetetramine (HMT), hexamethoxymethylol melamine (HMMM), hexamethylol melamine pentamethyl ether (HMMPME, e.g. Sumikanol 507A). Among these, HMT, HMMM, and HMMPME are preferable.

In the case that the rubber composition is used as a rubber composition for a breaker topping or a rubber composition for a sheet located on the top or bottom of a breaker edge/a sheet of a breaker topping, HMMM and HMMPME are preferable. This is because HMT produces ammonia, which adversely affects adhesion to the cords, as well as methylene during vulcanization. Still, even in the case that HMT is used, increasing the amount of a cobalt salt of an organic acid secures the adhesion to the cords.

In the case that the rubber composition is used as a rubber composition for a sidewall, a rubber composition for a base tread, a rubber composition for a tie gum, a rubber composition for a clinch apex, or a rubber composition for a soft bead apex, HMT is preferable.

Also in the case that the rubber composition is used as a rubber composition for a bead apex, a rubber composition for a strip apex, or a rubber composition for a bead wire topping, HMT is preferable.

The amount of the methylene donor is 0.04 to 10 parts by mass for each 100 parts by mass of the rubber component. If the amount is less than 0.04 parts by mass, sufficient handling stability, fuel economy, and steering response cannot be achieved. If the amount is more than 10 parts by mass, the elongation at break and fuel economy decrease.

In the case that the rubber composition is used as a rubber composition for a breaker topping or a rubber composition for a sheet located on the top or bottom of a breaker edge/a sheet of a breaker topping, the amount of the methylene donor (preferably HMMM and/or HMMPME) is preferably 1 to 7 parts by mass, and more preferably 2 to 5 parts by mass, for each 100 parts by mass of the rubber component, for the same reason as that for the amount of the alkylphenol resin.

In the case that the rubber composition is used as a rubber composition for a sidewall, a rubber composition for a base tread, a rubber composition for a tie gum, a rubber composition for a clinch apex, or a rubber composition for a soft bead apex, the amount of the methylene donor (preferably HMT) is preferably 0.04 to 5 parts by mass for each 100 parts by mass of the rubber component, for the same reason as that for the amount of the alkylphenol resin.

In the case that the rubber composition is used as a rubber composition for a bead apex, a rubber composition for a strip apex, or a rubber composition for a bead wire topping, the amount of the methylene donor (preferably HMT) is preferably 0.4 to 5 parts by mass, and more preferably 0.5 to 3 parts by mass, for each 100 parts by mass of the rubber component, for the same reason as that for the amount of the alkylphenol resin.

In the present invention, a softener such as aromatic oil, C5 petroleum resin, C9 petroleum resin, mixed aromatic/aliphatic resin, and TDAE oil may be used.

In the present invention, carbon black may be used. The use of carbon black leads to good reinforcement, and contributes to good handling stability, fuel economy, elongation at break, and steering response in a balanced manner. Examples of usable carbon blacks include, but not particularly limited to, GPF, FEF, HAF, ISAF, and SAF. Each of the carbon blacks may be used alone, or two or more of these may be used in combination.

In the case that the rubber composition is used as a rubber composition for a breaker topping or a rubber composition for a sheet located on the top or bottom of a breaker edge/a sheet of a breaker topping, the nitrogen adsorption specific surface area ($N_2SA$) of carbon black is preferably 50 to 110 m$^2$/g, and more preferably 70 to 90 m$^2$/g.

In the case that the rubber composition is used as a rubber composition for a sidewall, a rubber composition for a base tread, a rubber composition for a tie gum, a rubber composition for a clinch apex, or a rubber composition for a soft bead apex, the $N_2SA$ of carbon black is preferably 20 to 70 m$^2$/g, and more preferably 30 to 50 m$^2$/g.

In the case that the rubber composition is used as a rubber composition for a bead apex, a rubber composition for a strip apex, or a rubber composition for a bead wire topping, the $N_2SA$ of carbon black is preferably 20 to 90 m$^2$/g, and more preferably 25 to 50 m$^2$/g.

If the $N_2SA$ is smaller than the lower limit value, sufficient reinforcement tends not to be achieved. Meanwhile, if the $N_2SA$ is greater than the upper limit value, the viscosity of the rubber composition before vulcanization tends to be very high, decreasing the extrusion processability. Also, the fuel economy tends to decrease.

The nitrogen adsorption specific surface area of carbon black herein is measured based on JIS K6217-2:2001.

In the case that the rubber composition for a tire of the present invention contains carbon black, the amount of carbon black is preferably not less than 30 parts by mass, and more preferably not less than 40 parts by mass, for each 100 parts by mass of the rubber component. If the amount is less than 30 parts by mass, the effects of adding carbon black may not be sufficiently achieved. The amount of carbon black is preferably not more than 80 parts by mass, and more preferably not more than 65 parts by mass, for each 100 parts by mass of the rubber component. If the amount is more than 80 parts by mass, the extrusion processability and fuel economy tend to decrease.

In the case that the rubber composition is used as a rubber composition for a breaker topping or a rubber composition for a sheet located on the top or bottom of a breaker edge/a sheet of a breaker topping, the rubber composition preferably contains a cobalt salt of an organic acid.

Since a cobalt salt of an organic acid serves to form a bridge between the steel cords and the rubber, the use of a cobalt salt of an organic acid enables to increase the adhesion between the steel cords and the rubber. Specific examples of the cobalt salt of an organic acid include cobalt stearate, cobalt naphthenate, cobalt neodecanoate, and cobalt boron 3 neodecanoate. Particularly, cobalt stearate is preferable.

In the case that the rubber composition is used as a rubber composition for a breaker topping or a rubber composition for a sheet located on the top or bottom of a breaker edge/a sheet of a breaker topping, the amount of the cobalt salt of an organic acid, calculated as cobalt, is generally not less than 0.05 parts by mass, and preferably not less than 0.08 parts by mass, for each 100 parts by mass of the rubber component. If the amount is less than 0.05 parts by mass, the adhesion decreases, and thereby the durability decreases.

The amount, calculated as cobalt, is not more than 0.30 parts by mass, preferably not more than 0.20 parts by mass, and more preferably not more than 0.12 parts by mass, for each 100 parts by mass of the rubber component. If the amount is more than 0.30 parts by mass, the elongation at break and adhesion decrease, and thereby the durability decreases.

The rubber composition may contain a crosslinking agent other than the methylene donor. Examples of the crosslinking agent include sulfur and alkylphenol-sulfur chloride condensates. In the case that the rubber composition is used as a rubber composition for a bead apex, a rubber composition for a strip apex, or a rubber composition for a bead wire topping, the rubber composition preferably contains an alkylphenol-sulfur chloride condensate to give a rubber composition having high hardness.

Specific examples of the alkylphenol-sulfur chloride condensate include Tackirol V200 produced by Taoka Chemical Co., Ltd. The rubber composition also may optionally contain a vulcanization accelerator.

In the case that the rubber composition is used as a rubber composition for a breaker topping, a rubber composition for a sheet located on the top or bottom of a breaker edge/a sheet of a breaker topping, a rubber composition for a bead apex, a rubber composition for a strip apex, or a rubber composition for a bead wire topping, the amount of sulfur is preferably not less than 3 parts by mass, and more preferably not less than 5 parts by mass, for each 100 parts by mass of the rubber component. The amount of sulfur is preferably not more than 12 parts by mass, and more preferably not more than 10 parts by mass, for each 100 parts by mass of the rubber component. If the amount of sulfur is in the above range, the effects of the present invention can be more favorably achieved.

In the case of using sulfur that contains oil, the amount of sulfur indicates the amount of pure sulfur.

In the case that the rubber composition is used as a rubber composition for a bead apex, a rubber composition for a strip apex, or a rubber composition for a bead wire topping, the amount of the alkylphenol-sulfur chloride condensate is preferably not less than 0.5 parts by mass, and more preferably not less than 1 part by mass, for each 100 parts by mass of the rubber component. The amount of the alkylphenol-sulfur chloride condensate is preferably not more than 8 parts by mass, and more preferably not more than 6 parts by mass, for each 100 parts by mass of the rubber component. If the amount of the alkylphenol-sulfur chloride condensate is in the above range, the effects of the present invention can be more favorably achieved.

The rubber composition of the present invention may optionally contain additives generally used in production of a rubber composition, such as a filler for reinforcement (e.g. silica), a silane coupling agent, stearic acid, zinc oxide, an antioxidants of various types, and wax, as well as the above ingredients.

In the case that the rubber composition is used as a rubber composition for a breaker topping, a rubber composition for a sheet located on the top or bottom of a breaker edge/a sheet of a breaker topping, a rubber composition for a bead apex, a rubber composition for a strip apex, or a rubber composition for a bead wire topping, the amount of zinc oxide is preferably not less than 5 parts by mass, and more preferably not less than 8 parts by mass, for each 100 parts by mass of the rubber component. The amount of zinc oxide is preferably not more than 15 parts by mass, and more preferably not more than 12 parts by mass, for each 100 parts by mass of the rubber component. If the amount of zinc oxide is in the above range, the effects of the present invention can be more favorably achieved.

In the case that the rubber composition is used as a rubber composition for a sidewall, a rubber composition for a base tread, a rubber composition for a tie gum, a rubber composition for a clinch apex, or a rubber composition for a soft bead apex, the amount of zinc oxide is preferably not less than 3 parts by mass, and more preferably not less than 4 parts by mass, for each 100 parts by mass of the rubber component. The amount of zinc oxide is preferably not more than 8 parts by mass, and more preferably not more than 6 parts by mass, for each 100 parts by mass of the rubber component. If the amount of zinc oxide is in the above range, the effects of the present invention can be more favorably achieved.

The method of producing the rubber composition of the present invention may be a known method such as a method involving kneading the above ingredients in a rubber kneading apparatus such as an open roll mill or a Banbury mixer, and then vulcanizing the mixture.

The rubber composition of the present invention can be used for various tire components. The tire component is not particularly limited, but is preferably at least one selected from the group consisting of a bead apex, a cap tread, a base tread, a sidewall, a tie gum, a breaker (a component obtained by coating tire cords with the rubber composition for a breaker topping), a strip apex, a bead wire topping, a clinch apex, a soft bead apex, and a sheet located on the top or bottom of a breaker edge/a sheet of a breaker topping. The tire component is more preferably a breaker, a sheet located on the top or bottom of a breaker edge/a sheet of a breaker topping, a bead apex, a sidewall, a base tread, or a tie gum, and still more preferably a breaker, a bead apex, or a side wall.

A bead apex is a component arranged on the inner side of the clinch of a tire in such a manner as to extend from the bead core outwardly in the radial direction; specific examples thereof include components as illustrated in FIGS. 1 to 3 of JP 2008-38140 A.

A cap tread is the outer surface layer portion of a tread having a multilayer structure. A base tread is the inner layer portion of a tread having a multilayer structure. In the case of a tread having a two-layer structure, the tread includes an outer surface layer (cap tread) and an inner layer (base tread).

A sidewall is a component arranged on the outer side of the carcass between the tread portion and the bead core of the bead portion.

A tie gum is a component arranged on the inner side of the carcass cords and on the outer side of the inner liner; specific examples thereof include components as illustrated in FIG. 1 of JP 2010-095705 A.

A breaker is a component arranged inside the tread and on the radially outer side of the carcass; specific examples thereof include components as illustrated in FIG. 3 of JP 2003-94918 A.

A sheet located on the top or bottom of a breaker edge/a sheet of a breaker topping is a component arranged at an edge of the breaker and/or on the tire-radially inner side (between the breaker and the plies) or outer side (between the breaker and the tread) of the breaker; specific examples thereof include components as illustrated in FIG. 1 of JP 2009-046576 A.

A strip apex is an inner rubber reinforcement layer of the sidewall portion; specific examples thereof include components as illustrated in FIG. 1 of JP 2010-149677 A and FIG. 5 of JP 2008-038140 A.

A bead wire topping is a bead wire-covering rubber.

A clinch apex is a rubber portion arranged at an inner edge of the sidewall; specific examples thereof include components as illustrated in FIG. 1 of JP 2008-75066 A and FIG. 1 of JP 2004-106796 A.

A soft bead apex is a bead apex that is softer than a usual bead apex, that is, specifically, a bead apex softer than a usual bead apex used for a run-flat tire having a sidewall reinforcement layer (insert) arranged therein, or a softer rubber layer of a two-layer bead apex (consisting of a harder rubber layer arranged on the inner side in the tire radial direction, and a softer rubber layer arranged on the outer side in the tire radial direction) for a tire for a truck or bus.

The pneumatic tire of the present invention is produced by a usual method using the above rubber composition. That is, the method may include molding, before vulcanization, the rubber composition prepared by mixing various additives as appropriate, into the shape of a component (in the case of a breaker, coating tire cords with the rubber composition and then molding the coated cords into the shape of the breaker before vulcanization), assembling the molded product with other tire components so as to form an unvulcanized tire, and heating the unvulcanized tire under pressure in a vulcanizer.

Examples of tire cords usable in the present invention include organic fiber cords, steel cords, and hybrid cords of organic fiber and steel. Specific examples thereof include steel cords for a tire, 2+2/0.23 cords (tire cords produced by twisting two cords with two cords each having a cord diameter of 0.23 mm), and brass-plated high tension cords.

The pneumatic tire of the present invention can be used for passenger cars, trucks/buses, light trucks, and the like. Since the pneumatic tire of the present invention has high hardness (E*) and good elongation at break, the pneumatic tire provides good handling stability, good fuel economy, good elongation at break (durability), and good steering response in a balanced manner. Also, since the pneumatic tire has high hardness (E*) and good elongation at break, the pneumatic tire can maintain good handling stability, good steering response, and good resistance to external damage even if the weight of the tire is reduced. Further, development of a flat spot (deformation of the tire tread) can be effectively suppressed.

EXAMPLES

Hereinafter, the present invention will be described in more detail based on examples which, however, are not intended to limit the scope of the present invention.

The various chemical agents used in examples and comparative examples are listed below.

NR: TSR20

Carbon black (1): N326 ($N_2SA$: 81 $m^2/g$) from Cabot Japan K.K.

Antioxidant: Antioxidant 6C (SANTOFLEX 6PPD) from FLEXSYS

Zinc oxide: Zinc oxide (average particle size: 290 nm) from Mitsui Mining & Smelting Co., Ltd.

Cobalt stearate: cost-F (cobalt content: 9.5% by mass) from Dainippon Ink and Chemicals Sulfur: Crystex HS OT20 (insoluble sulfur containing 80% by mass of sulfur and 20% by mass of oil) from FLEXSYS Vulcanization accelerator DCBS: Nocceler DZ-G (N,N-dicyclohexyl-2-benzothiazolylsulfenamide) from Ouchi Shinko Chemical Industrial Co., Ltd.

HMT: Nocceler H (hexamethylenetetramine) from Ouchi Shinko Chemical Industrial Co., Ltd.

HMMPME: Sumikanol 507AP (hexamethylol melamine pentamethyl ether) from Taoka Chemical Co., Ltd.

C5 petroleum resin: Hilets G-100 from Mitsui Chemicals, Inc.

Cresol resin (PR-X11061): PR-X11061 (alkylphenol components (monomer components): o-cresol, m-cresol, and p-cresol, total amount of free alkylphenols: 0.6% by mass, amount of novolac phenol resin: 99.4% by mass, softening point: 128° C., Mw: 1800) from Sumitomo Bakelite Co., Ltd.

Cresol resin (prototype A): resin obtained by changing the purification method in the production of PR-X11061 and changing the total amount of free alkylphenols (alkylphenol components: same as those of PR-X11061, total amount of free alkylphenols: 1.5% by mass, amount of novolac phenol resin: 98.5% by mass, softening point: 124° C., Mw: 1880)

Cresol resin (prototype B): resin obtained by changing the purification method in the production of PR-X11061 and changing the total amount of free alkylphenols (alkylphenol components: same as those of PR-X11061, total amount of free alkylphenols: 5% by mass, amount of novolac phenol resin: 95% by mass, softening point: 110° C., Mw: 2090)

Sumikanol 610 Lot A: Sumikanol 610 [metacresol resin (alkylphenol components (monomer components): m-cresol only (the content of m-cresol is 100% by mass based on 100% by mass of a total of alkylphenol components used in production of the resin), total amount of free alkylphenols: 8% by mass, amount of novolac phenol resin: 92% by mass, softening point: 100° C., Mw: 2000] from Sumitomo Chemical Co., Ltd.

Sumikanol 610 Lot B: Sumikanol 610 [metacresol resin (alkylphenol components (monomer components): m-cresol only (the content of m-cresol is 100% by mass based on 100% by mass of a total of alkylphenol components used in production of the resin), total amount of free alkylphenols: 12% by mass, amount of novolac phenol resin: 88% by mass, softening point: 95° C., Mw: 2000] from Sumitomo Chemical Co., Ltd.

Cashew oil-modified phenol resin: PR12686 (cashew oil-modified phenol resin, amount of free phenol: 0.2% by mass, amount of novolac phenol resin: 99.8% by mass, softening point: 94° C., Mw: 5330) from Sumitomo Bakelite Co., Ltd.

SPB-containing BR: VCR617 (melting point of SPB: 200° C., amount of boiling n-hexane insoluble matter: 15 to 18% by mass, amount of SPB: 15 to 18% by mass) from Ube Industries, Ltd.

SBR: Nipol 1502 (E-SBR) from Zeon Corporation

Carbon black (2): N550 ($N_2SA$: 40 $m^2/g$) from Cabot Japan K.K.

Carbon black (3): N330 ($N_2SA$: 78 $m^2/g$) from Cabot Japan K.K.

Non-reactive alkylphenol resin: PR-19900 (softening point: 90° C.) from Sumitomo Bakelite Co., Ltd.

Stearic acid: Kiri from NOF Corporation

Vulcanization accelerator TBBS: Nocceler NS (N-tert-butyl-2-benzothiazolylsulfenamide) from Ouchi Shinko Chemical Industrial Co., Ltd.

V200: Tackirol V200 (alkylphenol-sulfur chloride condensate) from Taoka Chemical Co., Ltd.

PVI: Retarder CTP from Ouchi Shinko Chemical Industrial Co., Ltd.

Nd BR: CB24 (BR synthesized using an Nd catalyst, cis content: 96% by mass, vinyl content: 0.7% by mass, $ML_{1+4}$ (100° C.): 45, Mw/Mn: 2.69, Mw: 500,000, Mn: 186,000) from LANXESS Silica: Ultrasil VN3 ($N_2SA$: 175 $m^2/g$) from Evonik Degussa Wax: Ozoace 0355 from Nippon Seiro Co., Ltd.

TDAE: Vivatec 500 from H&R Group

Examples 1 to 21 and Comparative Examples 1 to 21

The materials in amounts shown in Tables 1 to 3 (the amount of sulfur in the Tables indicates the amount of pure sulfur), except the crosslinking agents, were kneaded in a 1.7-L Banbury mixer until the temperature reached 150° C. so that a kneaded mixture was obtained. Thereafter, the crosslinking agents were added to the kneaded mixture and then the resulting mixture was kneaded with an open two-roll mill until the temperature reached 105° C. to give an unvulcanized rubber composition.

A portion of the unvulcanized rubber composition was press-vulcanized at 170° C. for 12 minutes to give a vulcanized rubber composition.

In each of Examples 1 to 7 and Comparative Examples 1 to 7, another portion of the unvulcanized rubber composition was used to coat steel cords, and the coated cords were processed into the shape of a breaker. The resulting product was assembled with other tire components into an unvulcanized tire and the tire was vulcanized at 170° C. for 12 minutes to give a test tire (tire size: 225/40R18 92Y XL).

In each of Examples 8 to 14 and Comparative Examples 8 to 14, another portion of the unvulcanized rubber composition was assembled with bead wires and processed into the shape of a bead apex, and a test tire (tire size: 225/40R18 92Y XL) was produced in the same manner as above.

In each of Examples 15 to 21 and Comparative Examples 15 to 21, another portion of the unvulcanized rubber composition was processed into the shape of a sidewall, and a test tire (tire size: 225/40R18 92Y XL) was produced in the same manner as above.

Table 1 shows the formulations of the rubber compositions for a breaker topping, and the rubber compositions for a sheet located on the top or bottom of a breaker edge/a sheet of a breaker topping are based on the same formulations.

Table 2 shows the formulations of the rubber compositions for a bead apex, and the rubber compositions for a strip apex and the rubber compositions for a bead wire topping are based on the same formulations.

Table 3 shows the formulations of the rubber compositions for a sidewall, and the rubber compositions for a base tread, the rubber compositions for a tie gum, the rubber compositions for a clinch apex, and the rubber compositions for a soft bead apex are based on the same formulations. However, in the case of using the rubber composition for a clinch apex, it is preferable to increase the amounts of BR and carbon black and change the carbon black to N200 or N300.

The obtained unvulcanized rubber compositions, vulcanized rubber compositions, and test tires were subjected to the following evaluations. Tables 1 to 3 show the results.

(Complex Elastic Modulus (Hardness) (E*), Fuel Economy (Tan δ))

The loss tangent (tan δ) and complex elastic modulus (E*) were measured on each of the vulcanized rubber compositions using a viscoelasticity spectrometer (produced by Iwamoto Seisakusho Co., Ltd.) under the following conditions: a temperature of 70° C.; an initial strain of 10%; a dynamic strain of 2%; and a frequency of 10 Hz.

A smaller tan δ corresponds to lower rolling resistance and better fuel economy. A larger E* corresponds to better handling stability.

(Tensile Test)

Using No. 3 dumbbell-shaped test pieces made of the vulcanized rubber compositions, a tensile test was carried out at room temperature in accordance with JIS K 6251 ("Rubber, vulcanized or thermoplastic—Determination of tensile stress-strain properties"), and the elongation at break EB (%) was measured. A higher EB value indicates better elongation at break.

(Steering Response)

The test tire was mounted on every wheel of a SUV car, and the car was driven on a test course so that the steering response was evaluated on a ten-point scale based on sensory evaluation by a test driver. A higher point of evaluation corresponds to better steering response.

(Extrusion Processability)

Each of the unvulcanized rubber compositions was fed into a cold feed extruder, so that a rubber sheet having a size of 0.85 mm (thickness)×about 0.7 mm (width) was prepared.

In Examples 1 to 7 and Comparative Examples 1 to 7, the prepared rubber sheet was pressed onto the top and bottom of steel cords, and the surface flatness, finished state, rubber scorch, and edge flatness of the resulting sheet were observed and evaluated based on the following criteria.

+++: excellent
++: satisfactory
+: needs for improvement (inhibiting productivity of the process)
−: not allowing the production process to proceed normally In Examples 8 to 14 and Comparative Examples 8 to 14, the edge flatness, uprightness, finished state, and rubber scorch of the prepared rubber sheet assembled with bead wires were observed and evaluated based on the following criteria.

+++: excellent
++: satisfactory
+: needs for improvement (inhibiting productivity of the process)
−: not allowing the production process to proceed normally In Examples 15 to 21 and Comparative Examples 15 to 21, the surface flatness, finished state, rubber scorch, and edge flatness of the prepared rubber sheet were observed and evaluated based on the following criteria.

+++: excellent
++: satisfactory
+: needs for improvement (inhibiting productivity of the process)
−: not allowing the production process to proceed normally

TABLE 1

Rubber composition for a breaker topping

| | | Example | | | | | | |
|---|---|---|---|---|---|---|---|---|
| | | 1 | 2 | 3 | 4 | 5 | 6 | 7 |
| Component (parts by mass) | | | | | | | | |
| NR | TSR20 | 100 | 100 | 100 | 100 | 100 | 100 | 100 |
| Carbon black (1) | N326 | 55 | 55 | 55 | 55 | 52 | 55 | 52 |
| Antioxidant | 6PPD | 1 | 1 | 1 | 1 | 1 | 1 | 1 |
| Aid | Zinc oxide | 10 | 10 | 10 | 10 | 10 | 10 | 10 |
| | Cobalt stearate | 1 | 1 | 1 | 1 | 1 | 2 | 1 |
| Crosslinking agent | Sulfur | 7 | 7 | 7 | 7 | 7 | 7 | 7 |
| | Vulcanization accelerator DCBS | 0.8 | 0.8 | 0.8 | 0.8 | 0.8 | 0.8 | 0.8 |
| | HMT | | | | | | 0.3 | |
| | HMMPME | 2 | 2 | 3.33 | 1 | 6.66 | | 10 |
| Softener | C5 petroleum resin | 2 | 2 | | | | | |
| Resin | Cresol resin (PR-X11061) | 3 | | 5 | 1.5 | 5 | 3 | 5 |
| | Cresol resin (prototype A) | | 3 | | | | | |
| | Cresol resin (prototype B) | | | | | | | |
| | Smikanol 610 Lot A | | | | | | | |
| | Smikanol 610 Lot B | | | | | | | |
| | Cashew oil-modified phenol resin | | | | | | | |
| Evaluation result | | | | | | | | |
| Handling stability | E* 70° C. | 8.67 | 8.45 | 9.85 | 7.55 | 9.75 | 8.85 | 10.7 |
| Fuel economy | tan δ 70° C. | 0.108 | 0.113 | 0.094 | 0.11 | 0.089 | 0.098 | 0.085 |

TABLE 1-continued

| Rubber composition for a breaker topping | | | | | | | | |
|---|---|---|---|---|---|---|---|---|
| Elongation at break | EB % room temperature | 410 | 395 | 350 | 455 | 315 | 385 | 300 |
| Steering response | Index | 5+ | 5 | 6 | 5 | 6 | 5+ | 6 |
| Extrusion processability | +++ is the best | ++ | ++ | ++ | ++ | +++ | ++ | +++ |

| | | Comparative Example | | | | | | |
|---|---|---|---|---|---|---|---|---|
| | | 1 | 2 | 3 | 4 | 5 | 6 | 7 |
| Component (parts by mass) | | | | | | | | |
| NR | TSR20 | 100 | 100 | 100 | 100 | 100 | 100 | 100 |
| Carbon black (1) | N326 | 60 | 55 | 55 | 55 | 55 | 55 | 55 |
| Antioxidant | 6PPD | 1 | 1 | 1 | 1 | 1 | 1 | 1 |
| Aid | Zinc oxide | 10 | 10 | 10 | 10 | 10 | 10 | 10 |
| | Cobalt stearate | 1 | 1 | 1 | 1 | 1 | 1 | 1 |
| Crosslinking agent | Sulfur | 7 | 7 | 7 | 7 | 7 | 7 | 7 |
| | Vulcanization accelerator DCBS | 0.8 | 0.8 | 0.8 | 0.8 | 0.8 | 0.8 | 0.8 |
| | HMT | | | | | | | |
| | HMMPME | | 2 | 2 | 2 | 2 | 3.33 | 0.4 |
| Softener | C5 petroleum resin | 2 | 2 | 2 | 2 | 2 | 2 | 2 |
| Resin | Cresol resin (PR-X11061) | | | | | | | 0.8 |
| | Cresol resin (prototype A) | | | | | | | |
| | Cresol resin (prototype B) | | | | | 3 | 5 | |
| | Smikanol 610 Lot A | | | | 3 | | | |
| | Smikanol 610 Lot B | | | 3 | | | | |
| | Cashew oil-modified phenol resin | | 3 | | | | | |
| Evaluation result | | | | | | | | |
| Handling stability | E* 70° C. | 6.25 | 7.72 | 7.25 | 7.85 | 8.12 | 9.21 | 6.85 |
| Fuel economy | tan δ 70° C. | 0.145 | 0.15 | 0.142 | 0.146 | 0.137 | 0.145 | 0.129 |
| Elongation at break | EB % room temperature | 460 | 375 | 375 | 370 | 355 | 285 | 460 |
| Steering response | Index | 3 | 5 | 4 | 4 | 4+ | 5 | 3+ |
| Extrusion processability | +++ is the best | ++ | ++ | ++ | ++ | ++ | ++ | ++ |

TABLE 2

| Rubber composition for a bead apex | | | | | | | | |
|---|---|---|---|---|---|---|---|---|
| | | Example | | | | | | |
| | | 8 | 9 | 10 | 11 | 12 | 13 | 14 |
| Component (parts by mass) | | | | | | | | |
| SPB-containing BR | VCR617 | 30 | 30 | 30 | 30 | 30 | 30 | 30 |
| SBR | SBR1502 | 20 | 20 | 20 | 20 | 20 | 20 | 20 |
| NR | TSR20 | 50 | 50 | 50 | 50 | 50 | 50 | 50 |
| Carbon black (2) | N550 | 55 | 55 | 55 | 55 | 62 | | 55 |
| Carbon black (3) | N330 | | | | | | 50 | |
| Softener | Non-reactive alkylphenol resin | 1 | 1 | 1 | 1 | 1 | 1 | 1 |
| Antioxidant | 6PPD | 1 | 1 | 1 | 1 | 1 | 1 | 1 |
| Aid | Stearic acid | 3 | 3 | 3 | 3 | 3 | 3 | 3 |
| | Zinc oxide | 10 | 10 | 10 | 10 | 10 | 10 | 10 |
| Crosslinking agent | Sulfur | 7 | 7 | 7 | 7 | 7 | 7 | 7 |
| | Vulcanization accelerator TBBS | 3 | 3 | 3 | 4 | 3 | 3 | 3 |
| | V200 | 2 | 2 | 4 | 4 | 2 | 2 | 2 |
| | HMT | 1.5 | 1.5 | 1 | 0.6 | 1 | 1.5 | |
| | HMMPME | | | | | | | 9 |
| | PVI | 0.6 | 0.6 | 0.6 | 0.6 | 0.6 | 0.6 | 0.6 |
| Resin | Cresol resin (PR-X11061) | 15 | | 10 | 6 | 10 | 15 | 15 |
| | Cresol resin (prototype A) | | 15 | | | | | |
| | Cresol resin (prototype B) | | | | | | | |
| | Smikanol 610 Lot A | | | | | | | |
| | Smikanol 610 Lot B | | | | | | | |
| | Cashew oil-modified phenol resin | | | | | | | |
| Evaluation result | | | | | | | | |
| Handling stability | E* 70° C. | 58 | 48 | 57 | 49 | 58 | 56 | 56 |
| Fuel economy | tan δ 70° C. | 0.098 | 0.116 | 0.091 | 0.088 | 0.107 | 0.122 | 0.104 |
| Elongation at break | EB % room temperature | 145 | 130 | 125 | 130 | 165 | 140 | 175 |
| Steering response | Index | 6 | 5 | 6 | 5 | 6 | 5 | 6 |
| Extrusion processability | +++ is the best | ++ | ++ | ++ | ++ | ++ | ++ | ++ |

TABLE 2-continued

Rubber composition for a bead apex

| | | Comparative Example | | | | | | |
|---|---|---|---|---|---|---|---|---|
| | | 8 | 9 | 10 | 11 | 12 | 13 | 14 |
| Component (parts by mass) | | | | | | | | |
| SPB-containing BR | VCR617 | 30 | 30 | 30 | 30 | 30 | 30 | 30 |
| SBR | SBR1502 | 20 | 20 | 20 | 20 | 20 | 20 | 20 |
| NR | TSR20 | 50 | 50 | 50 | 50 | 50 | 50 | 50 |
| Carbon black (2) | N550 | 55 | 55 | 55 | 55 | 55 | 55 | 55 |
| Carbon black (3) | N330 | | | | | | | |
| Softener | Non-reactive alkylphenol resin | 1 | 1 | 1 | 1 | 1 | 1 | 1 |
| Antioxidant | 6PPD | 1 | 1 | 1 | 1 | 1 | 1 | 1 |
| Aid | Stearic acid | 3 | 3 | 3 | 3 | 3 | 3 | 3 |
| | Zinc oxide | 10 | 10 | 10 | 10 | 10 | 10 | 10 |
| Crosslinking agent | Sulfur | 7 | 7 | 7 | 7 | 7 | 7 | 7 |
| | Vulcanization accelerator TBBS | 3 | 3 | 3 | 3 | 3 | 3 | 3 |
| | V200 | 2 | 2 | 2 | 2 | 2 | 6 | 2 |
| | HMT | 1.5 | 1.5 | 1.5 | 1.5 | 2 | 1.5 | 1.5 |
| | HMMPME | | | | | | | |
| | PVI | 0.6 | 0.6 | 0.6 | 0.6 | 0.6 | 0.6 | 0.6 |
| Resin | Cresol resin (PR-X11061) | | | | | | | 25 |
| | Cresol resin (prototype A) | | | | | | | |
| | Cresol resin (prototype B) | | | | 15 | | | |
| | Smikanol 610 Lot A | | | 15 | | | | |
| | Smikanol 610 Lot B | | 15 | | | | | |
| | Cashew oil-modified phenol resin | | | | | 20 | 15 | |
| Evaluation result | | | | | | | | |
| Handling stability | E* 70° C. | 43 | 20 | 27 | 37 | 55 | 56 | 68 |
| Fuel economy | tan δ 70° C. | 0.121 | 0.118 | 0.122 | 0.118 | 0.139 | 0.103 | 0.085 |
| Elongation at break | EB % room temperature | 125 | 155 | 125 | 155 | 95 | 75 | 95 |
| Steering response | Index | 4 | 3 | 3 | 3+ | 5 | 5 | 6 |
| Extrusion processability | +++ is the best | ++ | ++ | ++ | ++ | – (scorch) | – (scorch) | + |

TABLE 3

Rubber composition for a sidewall

| | | Example | | | | | | |
|---|---|---|---|---|---|---|---|---|
| | | 15 | 16 | 17 | 18 | 19 | 20 | 21 |
| Component (parts by mass) | | | | | | | | |
| NR | TSR20 | 60 | 60 | 60 | 60 | 60 | 60 | 60 |
| BR | Nd BR | 40 | 40 | 40 | 40 | 40 | 40 | 40 |
| Carbon black (2) | N550 | 48 | 48 | 48 | 48 | 48 | 48 | 43 |
| Silica | VN3 | | | | | | | 10 |
| Antioxidant | Wax | 2 | 2 | 2 | 2 | 2 | 2 | 2 |
| | 6PPD | 3 | 3 | 3 | 3 | 3 | 3 | 3 |
| Aid | Zinc oxide | 5 | 5 | 5 | 5 | 5 | 5 | 5 |
| | Stearic acid | 2 | 2 | 2 | 2 | 2 | 2 | 2 |
| Crosslinking agent | Sulfur | 1.7 | 1.7 | 1.7 | 1.7 | 1.7 | 1.7 | 1.7 |
| | Vulcanization accelerator TBBS | 0.7 | 0.7 | 0.7 | 0.7 | 0.7 | 0.7 | 0.7 |
| | HMT | 0.2 | 0.2 | 0.4 | 0.1 | 1.2 | | 0.4 |
| | HMMPME | | | | | | 1.33 | |
| Softener | TDAE | 8 | 8 | 8 | 8 | 8 | 8 | 8 |
| Resin | Cresol resin (PR-X11061) | 2 | | 4 | 1 | 4 | 2 | 4 |
| | Cresol resin (prototype A) | | 2 | | | | | |
| | Cresol resin (prototype B) | | | | | | | |
| | Smikanol 610 Lot A | | | | | | | |
| | Smikanol 610 Lot B | | | | | | | |
| | Cashew oil-modified phenol resin | | | | | | | |
| Evaluation result | | | | | | | | |
| Handling stability | E* 70° C. | 4.72 | 4.55 | 5.66 | 4.21 | 5.88 | 4.77 | 5.72 |
| Fuel economy | tan δ 70° C. | 0.118 | 0.125 | 0.108 | 0.137 | 0.103 | 0.121 | 0.092 |
| Elongation at break | EB % room temperature | 560 | 550 | 445 | 585 | 420 | 575 | 545 |
| Steering response | Index | 5+ | 5+ | 6 | 5 | 6 | 5+ | 6 |
| Extrusion processability | +++ is the best | ++ | ++ | ++ | ++ | + (slight scorch) | ++ | ++ |

TABLE 3-continued

Rubber composition for a sidewall

| | | Comparative Example | | | | | | |
|---|---|---|---|---|---|---|---|---|
| | | 15 | 16 | 17 | 18 | 19 | 20 | 21 |
| Component (parts by mass) | | | | | | | | |
| NR | TSR20 | 60 | 60 | 60 | 60 | 60 | 60 | 60 |
| BR | Nd BR | 40 | 40 | 40 | 40 | 40 | 40 | 40 |
| Carbon black (2) | N550 | 48 | 48 | 48 | 48 | 48 | 48 | 48 |
| Silica | VN3 | | | | | | | |
| Antioxidant | Wax | 2 | 2 | 2 | 2 | 2 | 2 | 2 |
| | 6PPD | 3 | 3 | 3 | 3 | 3 | 3 | 3 |
| Aid | Zinc oxide | 5 | 5 | 5 | 5 | 5 | 5 | 5 |
| | Stearic acid | 2 | 2 | 2 | 2 | 2 | 2 | 2 |
| Crosslinking agent | Sulfur | 1.7 | 1.7 | 1.7 | 1.7 | 1.7 | 1.7 | 1.7 |
| | Vulcanization accelerator TBBS | 0.7 | 0.7 | 0.7 | 0.7 | 0.7 | 0.7 | 0.7 |
| | HMT | | 0.2 | 0.2 | 0.2 | 0.2 | 0.4 | 0.05 |
| | HMMPME | 2 | 2 | 2 | 2 | 2 | 2 | 2 |
| Softener | TDAE | 8 | 8 | 8 | 8 | 8 | 8 | 8 |
| Resin | Cresol resin (PR-X11061) | | | | | | | 0.5 |
| | Cresol resin (prototype A) | | | | | | | |
| | Cresol resin (prototype B) | | | | | 2 | 4 | |
| | Smikanol 610 Lot A | | | | 2 | | | |
| | Smikanol 610 Lot B | | | 2 | | | | |
| | Cashew oil-modified phenol resin | | 2 | | | | | |
| Evaluation result | | | | | | | | |
| Handling stability | E* 70° C. | 3.62 | 4.32 | 4.46 | 4.52 | 4.58 | 5.11 | 3.95 |
| Fuel economy | tan δ 70° C. | 0.152 | 0.154 | 0.145 | 0.14 | 0.132 | 0.129 | 0.142 |
| Elongation at break | EB % room temperature | 590 | 525 | 445 | 450 | 505 | 375 | 580 |
| Steering response | Index | 3 | 4 | 4 | 4 | 5 | 5 | 3+ |
| Extrusion processability | +++ is the best | ++ | ++ | ++ | ++ | ++ | ++ | ++ |

Tables 1 to 3 show that good handling stability, good fuel economy, good elongation at break, and good steering response were achieved in a balanced manner while good extrusion processability was maintained, in the examples in which the rubber composition included specific amounts of an alkylphenol resin and a methylene donor, the alkylphenol resin was produced from formaldehyde and at least two compounds selected from the group consisting of a 2-alkylphenol, a 3-alkylphenol, and a 4-alkylphenol, and the total amount of free alkylphenols was not more than a specific amount.

The invention claimed is:

1. A rubber composition for a tire, comprising:
   100 parts by mass of a rubber component;
   0.5 to 20 parts by mass of an alkylphenol resin; and
   0.04 to 10 parts by mass of a methylene donor,
   wherein the alkylphenol resin is produced from formaldehyde and at least two compounds selected from the group consisting of a 2-alkylphenol, a 3-alkylphenol, and a 4-alkylphenol,
   the alkylphenol resin comprises 96 to 100% by mass of a novolac phenol resin, and
   a total amount of the free 2-alkylphenol, 3-alkylphenol, and 4-alkylphenol in the alkylphenol resin is not more than 3% by mass.

2. The rubber composition for a tire according to claim 1, wherein the 2-alkylphenol, the 3-alkylphenol, and the 4-alkylphenol are o-cresol, m-cresol, and p-cresol, respectively.

3. The rubber composition for a tire according to claim 1, wherein the alkylphenol resin is produced from a 2-alkylphenol, a 3-alkylphenol, a 4-alkylphenol, and formaldehyde.

4. The rubber composition for a tire according to claim 1, wherein the total amount of the free 2-alkylphenol, 3-alkylphenol, and 4-alkylphenol in the alkylphenol resin is not more than 1% by mass.

5. A rubber composition for a tire, comprising:
   100 parts by mass of a rubber component;
   0.5 to 20 parts by mass of an alkylphenol resin; and
   0.04 to 10 parts by mass of a methylene donor,
   wherein the alkylphenol resin is produced from formaldehyde and at least two compounds selected from the group consisting of a 2-alkylphenol, a 3-alkylphenol, and a 4-alkylphenol,
   a total amount of the free 2-alkylphenol, 3-alkylphenol, and 4-alkylphenol in the alkylphenol resin is not more than 3% by mass, and
   the alkylphenol resin has a softening point of 115° C. to 140° C.

6. The rubber composition for a tire according to claim 1, wherein the methylene donor is at least one compound selected from the group consisting of hexamethylenetetramine, hexamethoxymethylol melamine, and hexamethylol melamine pentamethyl ether.

7. A breaker topping or a sheet located on the top or bottom of a breaker edge/a sheet of a breaker topping made from the rubber composition according to claim 1,
   wherein the rubber composition comprises
   1 to 5 parts by mass of the alkylphenol resin and
   1 to 7 parts by mass of hexamethoxymethylol melamine and/or hexamethylol melamine pentamethyl ether as the methylene donor, for each 100 parts by mass of the rubber component.

8. A sidewall, a base tread, a tie gum, a clinch apex, or a soft bead apex made from the rubber composition according to claim 1, wherein the rubber composition comprises
0.5 to 5 parts by mass of the alkylphenol resin and
0.04 to 5 parts by mass of hexamethylenetetramine as the methylene donor, for each 100 parts by mass of the rubber component.

9. A bead apex, a strip apex, or a bead wire topping made from the rubber composition according to claim 1,
wherein the rubber composition comprises
5 to 20 parts by mass of the alkylphenol resin and
0.4 to 5 parts by mass of hexamethylenetetramine as the methylene donor, for each 100 parts by mass of the rubber component.

10. A bead apex, a strip apex, or a bead wire topping made from the rubber composition of claim 1,
wherein the rubber composition further comprises
40 to 80 parts by mass of carbon black having a nitrogen adsorption specific surface area of 25 to 50 m$^2$/g for each 100 parts by mass of the rubber component.

11. A pneumatic tire comprising a tire component made from the rubber composition according to claim 1.

12. The pneumatic tire according to claim 11,
wherein the tire component is at least one selected from the group consisting of a bead apex, a cap tread, a base tread, a sidewall, a tie gum, a breaker, a strip apex, a bead wire topping, a clinch apex, a soft bead apex, and a sheet located on the top or bottom of a breaker edge/a sheet of a breaker topping.

13. A pneumatic tire comprising a tire component made from the rubber composition according to claim 2.

14. A pneumatic tire comprising a tire component made from the rubber composition according to claim 3.

15. A pneumatic tire comprising a tire component made from the rubber composition according to claim 4.

16. A pneumatic tire comprising a tire component made from the rubber composition according to claim 5.

17. A pneumatic tire comprising a tire component made from the rubber composition according to claim 6.

18. A pneumatic tire comprising a tire component made from the rubber composition according to claim 7.

* * * * *